Jan. 25, 1949.   A. J. PENICK   2,460,238
CASING HEAD
Filed Sept. 18, 1944   2 Sheets-Sheet 1

INVENTOR.
Arthur J. Penick
BY
E. V. Hardway
attorney.

Jan. 25, 1949.  A. J. PENICK  2,460,238
CASING HEAD
Filed Sept. 18, 1944  2 Sheets-Sheet 2

INVENTOR.
Arthur J. Penick
BY E. J. Hardway
attorney.

Patented Jan. 25, 1949

2,460,238

UNITED STATES PATENT OFFICE 2,460,238

CASING HEAD

Arthur J. Penick, Houston, Tex., assignor to Oil Center Tool Company, Houston, Tex., a corporation of Texas Application September 18, 1944, Serial No. 554,693

2 Claims. (Cl. 166—14)

This invention relates to a casing head.

The invention herein disclosed embodies improvements over that type of casing head disclosed in co-pending application for casing head filed in the United States Patent Office June 16, 1944 under Serial No. 540,683, now Patent No. 2,400,254, granted May 14, 1946.

An object of the invention is to provide a head for oil wells which includes novel means for forming a fluid-tight seal between it and an inner pipe through the head.

Another object of the invention is to provide a well head of the character described of such construction that leakage of the fluid under pressure can be readily detected.

It is a further object of the invention to provide, in a well head, a novel type of sealing gasket between the head sections that will be very efficient in preventing leakage.

With the above and other objects in view, the invention has particular relation to certain novel features of construction, operation and arrangement of parts, an example of which is given in this specification and illustrated in the accompanying drawings, wherein.

Figures 1, 2:
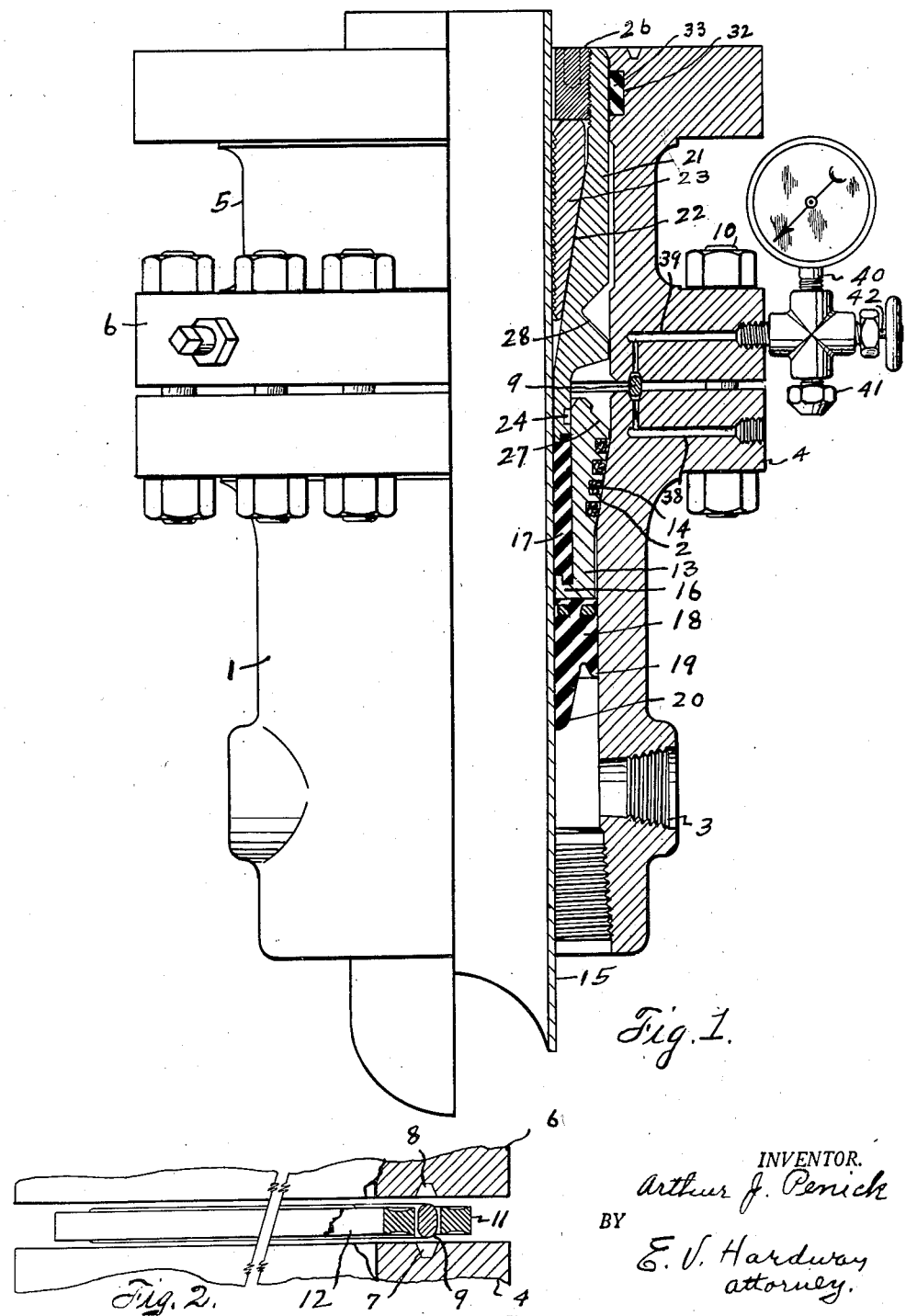
Figure 1 shows a side elevation of the head, partly in section.
Figure 2 shows a fragmentary side view, partly in section, showing the seal between the head sections before pressure is applied thereto.

Referring now more particularly to the drawings wherein like numerals of reference designate the same parts in each of the figures, the numeral 1 designates the lower section of the casing head, whose lower end is internally threaded to be screwed onto the upper end of the well casing. Its upper end is provided with a downwardly converging inside seat 2, and beneath said seat the lower section 1 has one or more internally threaded outlets 3, for the connection of outlet pipes thereto.

The upper end of the section 1 has the external, annular flange 4 thereon.

Figure 4:
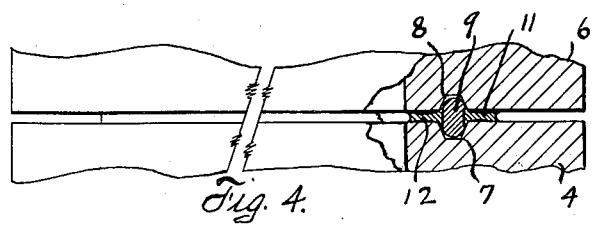
Figure 4 shows a fragmentary side elevation showing the seal between the head sections after said sections are bolted together and the pressure is applied to the seal.

The numeral 5 designates the upper section of the casing head whose lower end is formed with an external, annular, flange 6, which coincides with the flange 4. These flanges have coinciding, annular grooves 7 and 8, to receive the annular seal ring 9. This seal ring is formed of hard metal, such as steel, and when the flanges are bolted together, by the bolts 10, this seal ring 9 forms seals with the grooves 7 and 8 to prevent leakage. However the seal ring, or gasket, 9, will eventually corrode and allow the fluid in the well under pressure to escape. In order to protect the seal ring 9 and prevent leakage, the outside and inside rings 11 and 12, have been provided. These rings 11 and 12, are preferably formed of soft metal, such as lead. They are fitted one around the ring 9 and the other within it. Each ring 11 and 12 has the concaved grooves therearound in the upper and under faces thereof, as shown in Figure 2. When the flanges 4 and 6 are drawn together by the bolts 10, so as to seat the ring 9 closely in grooves 7 and 8, the rings 11 and 12 will be subjected to compression, causing the material thereof adjacent the ring 9 to flow into the grooves 7 and 8 on each side of the ring 9, as shown in Figure 4, and causing the lips at the other sides of the rings 11 and 12 to form close fitting seals with the respective flanges 4 and 6 so that the metal ring 9 will be protected from moisture as well as from any well fluid containing acid or other injurious substances. The life of the ring 9 will thus be indefinitely preserved and a leak proof joint will be formed between the sections of the casing head.

The numeral 13 designates the metal cage of the pressure head. This cage has the external, downwardly tapering portion which fits on to the seat 2 and which has the countersunk, annular seal rings 14 therein to form a fluid-tight seal with the seat 2. The lower end of the pressure head cage is inwardly thickened to closely surround the inner pipe 15 and thus forming the inside, annular, upwardly facing shoulder 16 whereon there is supported an expansible sleeve 17 which surrounds the inner pipe and which is preferably formed of rubber.

Suitably anchored to the lower end of the cage 13 there is a seal ring 18, formed of resilient material, such as rubber, which surrounds the inner pipe and which fits closely within the casing head and also fits closely around the inner pipe 15. The lower end of this seal ring 18 is formed with the annular lip 19, which fits closely against the casing head wall and the annular lip 20, which fits closely around the inner pipe. The parts 13, 14, 17 and 18 constitute the pressure head, as herein referred to.

Fitted within the upper section 5 of the casing head there is a slip bowl 21, having an inside, downwardly tapering seat 22, to receive the wedge-shaped slips 23. A plurality of these slips, preferably three, will be provided and their inner surfaces are toothed to engage and support the inner pipe 15.

The lower end of the slip bowl 21, is reduced in external diameter to fit into the upper end of the cage 13 and against the upper end of the seal ring 17.

Figure 3:
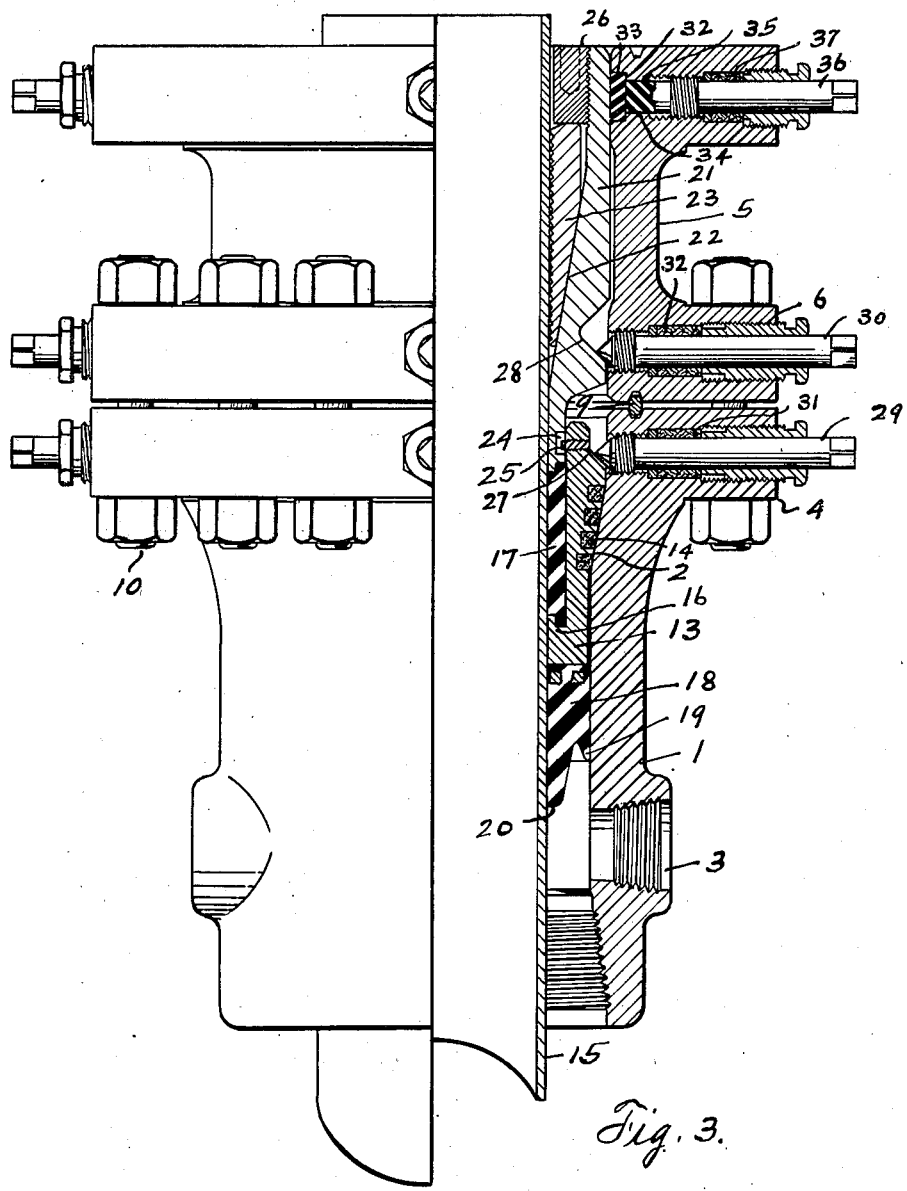
Figure 3 shows a side view, shown partly in section, taken at right angles to the view shown in Figure 1.

The reduced lower end of the slip bowl has an external, annular groove 24, therearound and screwed through the upper end of the cage 13 are a number of keys as 25, shown in Figure 3, whose inner ends project into said groove to prevent the detachment of the bowl from the cage.

The slips 23 may be retained in the bowl, and in engagement with the inner pipe, by means of a ring nut 26 screwed into the upper end of the bowl and in abutting relation with the upper ends of said slips. For convenience in assembly the rings nut may be made of two half round sections.

The numeral 27 designates an external, annular downwardly and outwardly tapering face on the upper end of the cage 13 and the numeral 28 designates an external, annular outwardly and downwardly tapering face on the bowl 21. Screwed radially through the flange 4 are the lock down bolts 29 and screwed radially through the flange 6 are the lock down bolts 30. These bolts 29 and 30 are surrounded by the respective stuffing boxes 31 and 32 to prevent leakage past them. The inner ends of the bolts 29, 30 are conical in form and adapted to bear against the respective faces 27, 28.

The upper end of the head section 5 has an internal, annular groove 32 therearound to receive the annular packing ring 33 which surrounds the upper end of the slip bowl. Radiating from the groove 32 are the bores 34 to contain reserve supplies of packing 35. Threaded into the upper end of the head section 5 are the radial plungers 36 which are surrounded by stuffing boxes 37 and and whose inner ends abut the corresponding reserve supplies 35.

It is to be understood that a conventional type of blowout preventer will be mounted on the upper end of the casing head and the inner pipe 15 will be run through it, in completing the well. When the string of inner pipe has been run the pressure head and slip bowl will be passed over the upper end of the inner pipe into the casing head. This will be done before the slips 23 and the ring nut 26 are assembled in the slip bowl. While the string is being run the lock down bolts 29 and 30 and the plungers 36 will be retracted outwardly. When the cage 13 has seated on the seat 2 the lock down bolts 29 may be then screwed inwardly into engagement with the face 27 to lock the cage securely in place and the lock down bolts 30 may then be screwed inwardly into engagement with the face 28 to force the slip bowl 27 downwardly against the packing sleeve 17 to expand it. Escape of well fluid under pressure between the inner pipe and the casing head will thus be prevented. The well may then be washed by forcing clean fluid down through the inner pipe 15 and during this washing process the inner pipe may be elevated and lowered if desired.

The conventional blowout preventer, above referred to, may be removed from the casing head either before or after the washing process. When the slip bowl has been secured in place the plunger 36 may be screwed inwardly causing flow of the reserve supplies of packing material 34 into the groove 32 thus causing the packing 33, surrounding the slip bowl, to form a fluid tight seal between the slip bowl and the casing head. The inner pipe 15 may then be adjusted to its final location and the slips 23 then inserted into place and the ring nut 26 screwed into the upper end of the slip bowl to force the slips into secure engagement with the inner pipe so as to thereafter support said inner pipe in place. Should a leakage develop past the packing 14 the lock down bolts 29 may be screwed further inwardly to force the cage 13 further downwardly to stop the leakage and the bolts 30 may be screwed further inwardly to force the slip bowl downwardly against the packing sleeve 17 to further expand it. The plungers 36 may also be screwed inwardly, from time to time, to tighten up on the packing ring 33.

The numeral 38 designates a radial duct leading inwardly through the flange 4 and the numeral 39 designates a radial duct leading inwardly through the flange 6. These ducts terminate in the respective grooves 7 and 8, as shown in Figure 1. Their outer ends are threaded for the connection of conventional pressure gauges 40 thereto. Only one of said gauges is shown in Figure 1. The ducts 38 and 39 will be circumferentially offset to give room for the two gauges. When the flanges 4 and 6 have been clamped together by the bolts 10 the seal may be tested by removing the closure cap 41 from the gauges and applying fluid pressure to the seal through the corresponding duct. When the pressure is applied the gauge valve should be opened by turning the valve stem 42 in an appropriate direction. The amount of pressure applied will be indicated by the gauge. The gauge valve may then be closed to entrap the pressure in the corresponding duct and the cap 41 may then be replaced and the valve gauge opened so that the entrapped pressure will be indicated by the gauge. These gauges are part of the permanent installation and by inspecting them from time to time it can be readily ascertained whether or not the seal between the flanges 4 and 6 is leaking. If it is the nuts on the bolts 10 may be tightened up until the leakage is stopped.

The drawings and description are illustrative merely while the broad principle of the invention will be defined by the appended claims.

What I claim is:

1. In a well head having adjacent sections formed with registering grooves, a hard metal seal ring in the grooves and a soft metal, annular, gasket adjacent the seal ring and clamped between said sections with its margin, adjacent said ring, having lip-like, annular extensions which extend into both grooves.

2. In well equipment having adjacent sections formed with plane opposing faces which are provided with registering grooves, a hard metal seal ring seated in said grooves, an annular soft metal gasket between said faces adjacent the seal ring and whose margins, adjacent the seal ring and remote from the seal ring, are thicker than the intermediate portion of the gasket, said gasket being clamped between said faces and the thickened portion of the seal ring adjacent the gasket forming an annular lip which projects into the grooves on the adjacent side of the seal ring and the thickened margin of the gasket remote from the seal ring forming fluid tight seals with said faces.

ARTHUR J. PENICK.

(References on following page)

REFERENCES CITED

The following references are of record in the file of this patent:

UNITED STATES PATENTS

| Number | Name | Date |
|---|---|---|
| 368,189 | Carter | Aug. 16, 1887 |
| 695,174 | Roller | Mar. 11, 1902 |
| 2,103,586 | Kitchel et al. | Dec. 28, 1937 |
| 2,104,808 | Neuhaus et al. | Jan. 11, 1938 |
| 2,232,884 | Penick et al. | Feb. 25, 1941 |
| 2,293,012 | Barker | Aug. 11, 1942 |
| 2,306,102 | Penick et al. | Dec. 22, 1942 |
| 2,313,169 | Penick et al. | Mar. 9, 1943 |
| 2,337,221 | Allen | Dec. 12, 1943 |
| 2,350,867 | Bean et al. | June 6, 1944 |
| 2,400,254 | Penick | May 14, 1946 |